United States Patent
Ramamoorthy et al.

(10) Patent No.: US 10,778,567 B1
(45) Date of Patent: *Sep. 15, 2020

(54) METHOD AND PROCEDURE FOR LOOP DETECTION IN MULTI-CHASSIS LINK AGGREGATION GROUP (MCLAG) DEPLOYMENT WITHIN A COMMUNICATIONS SYSTEM

(71) Applicant: Juniper Networks, Inc., Sunnyvale, CA (US)

(72) Inventors: Lokesh Babu Mandalapoo Ramamoorthy, Bangalore (IN); Saurabh Saksena, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,321

(22) Filed: Feb. 22, 2019

Related U.S. Application Data

(63) Continuation of application No. 15/251,728, filed on Aug. 30, 2016, now Pat. No. 10,257,075.

(51) Int. Cl.
*H04W 56/00* (2009.01)
*H04L 12/705* (2013.01)
*H04L 12/715* (2013.01)
*H04L 12/46* (2006.01)

(52) U.S. Cl.
CPC ............ *H04L 45/18* (2013.01); *H04L 12/467* (2013.01); *H04L 45/64* (2013.01)

(58) Field of Classification Search
CPC ........ H04L 45/18; H04L 12/467; H04L 45/64
USPC ......................................................... 370/254
See application file for complete search history.

(56) References Cited

U.S. PATENT DOCUMENTS

| | | | |
|---|---|---|---|
| 9,628,375 B2* | 4/2017 | Pathangi Narasimhan | H04L 45/48 |
| 2012/0033668 A1* | 2/2012 | Humphries | H04L 12/185 370/390 |
| 2014/0036924 A1* | 2/2014 | Christenson | H04L 12/4641 370/395.53 |

* cited by examiner

*Primary Examiner* — Sai Ming Chan
(74) *Attorney, Agent, or Firm* — Cooley LLP

(57) ABSTRACT

Apparatus and methods described herein relate to an apparatus including a set of ports and a processor operatively coupled to each port of the set of ports. A port from the set of ports can be associated with a port of a multi-chassis aggregate (MCAE) interface and a virtual local area network (VLAN). The processor can generate an untagged data unit and tagged data units. The processor can send the untagged data unit and the tagged data units via the port from the set of ports, and can receive a tagged data unit included in the tagged data units, and/or the untagged data unit. The processor can also forward the received data unit to a destination network peer when the received tagged data unit is associated with the VLAN, and can disable the port of the MCAE interface in response to the port from the set of ports receiving the data unit, when the received data unit is associated with the VLAN.

20 Claims, 7 Drawing Sheets

US 10,778,567 B1

METHOD AND PROCEDURE FOR LOOP DETECTION IN MULTI-CHASSIS LINK AGGREGATION GROUP (MCLAG) DEPLOYMENT WITHIN A COMMUNICATIONS SYSTEM

CROSS-REFERENCE TO RELATED APPLICATION

This application is a continuation of U.S. patent application Ser. No. 15/251,728, now U.S. Pat. No. 10,257,075, filed on Aug. 30, 2016, and entitled "Method and Procedure for Loop Detection in Multi-Chassis Link Aggregation Group (MCLAG) Deployment Within a Communications System", the disclosure of which is incorporated herein by reference in its entirety.

FIELD

The methods and apparatus described herein are generally related, for example, to loop detection in multi-chassis link aggregation group (MCLAG) deployment.

BACKGROUND

In some known network systems, a network may determine when a communication loop occurs (e.g., when a data packet is sent by a port to that same port, and/or the like). Such known network systems, however, may use resource-intensive protocols such as spanning tree protocol (STP) and/or similar methods to detect loops. For example, such methods may specify that ports always be active (even when a loop has occurred), and/or can include large quantities of data in data units, so as to detect potential loops. Such methods can result in intensive usage of network and/or device resources (e.g., due to the use of data packets generated using resource-intensive protocols, and/or due to ports being active even when they are receiving looped data units). Other methods as used by known network systems may also block all ports at a particular network device, and/or discard data units received at a particular network device. Such methods may result in the loss of data packets that a network administrator may wish to still forward to other devices in the network, even when a loop has been detected.

Accordingly, a need exists for methods and apparatus that can allow a network to detect loops.

SUMMARY

Apparatus and methods described herein relate to an apparatus including a plurality of ports, a port from the plurality of ports associated with a virtual local area network (VLAN) from a plurality of VLANs, the port being associated with a port of a multi-chassis aggregate (MCAE) interface. The apparatus also includes a processor operatively coupled to each port of the plurality of ports, and that can generate an untagged data unit and a set of tagged data units, a tagged data unit of the set of tagged data units being associated with the VLAN. The processor can send the untagged data unit and the set of tagged data units via the plurality of ports. The processor can receive a tagged data unit and/or an untagged data unit via the port, the tagged data unit being included in the set of tagged data units, and can forward the tagged data unit and/or untagged data unit to a network peer when the tagged data unit is associated with the VLAN. The processor can also disable the port of the MCAE interface in response to the port receiving the tagged data unit and/or untagged data unit when the tagged data unit and/or untagged data unit is associated with the VLAN.

DETAILED DESCRIPTION

In some implementations, a multi-chassis link aggregation group (MCLAG) network device (e.g., such as a network switch, router, and/or a similar device) can send data packets (also referred to herein as "data units") via a port associated with a multi-chassis aggregate (MCAE) interface (e.g., associated with a virtual local area network (VLAN)). In instances where a loop is not detected, the data packets can be sent to MCLAG peer devices, and/or to other network devices, and may not be sent back to the port associated with the MCLAG network device. In instances where a loop is detected, however, the data packets may return to a port of the MCLAG network device (specifically, a loop can be detected when the MCAE interface receives a data packet that is sent to a port of the MCLAG network device). The MCLAG network device can then disable ports involved in the loop (i.e., by disabling the MCAE interface), so as to end the loop and to prevent the loop from affecting the network, e.g., until the loop can be resolved. The MCLAG network device can send loop detect notifications over predetermined time intervals, so as to notify MCLAG network peers that a loop has been detected, and so as to cause the MCLAG peers to disable ports at those MCLAG peers, e.g., until the loop has been resolved.

Figure 1:
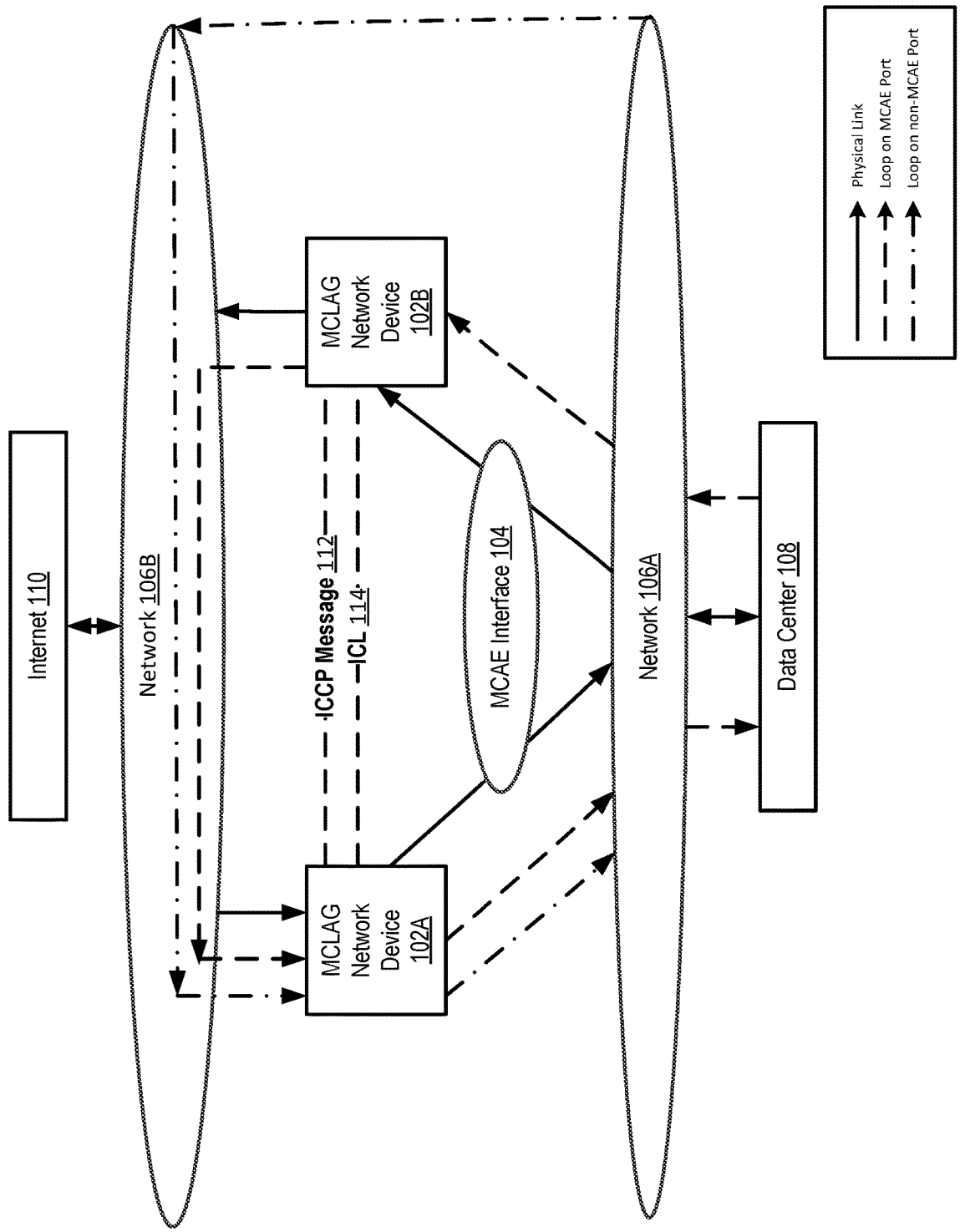
FIG. 1 is a schematic diagram illustrating data units being send across multiple networks, according to an embodiment.

FIG. 1 is a schematic diagram illustrating an example of data units being send across multiple networks. For example, in some implementations, a MCLAG network device 102A can communicate with networks 106A and 106B (e.g., can receive data packets and/or data units from network 106B, and can send data packets to network 106A, e.g., so as to forward data packets to a MCLAG peer 102B). Network 106A can be a downstream sub-network of network 106B, and can facilitate communication with a data center and/or similar network entities. Network 106B can be an upstream network managed by a network core management device (not shown), and can facilitate communication with other network devices in network 106B. In some implementations, networks 106A and 106B can be associated with different VLANs; however, misconfiguration and/or similar errors in the networks can cause both networks 106A-B to be erroneously associated with the same VLAN. Such errors can cause network loops, where data units sent to network 106A may be sent to 106B, and may be, in turn, sent back to MCLAG network device 102A.

The MCLAG network device 102A can be operatively coupled to the networks 106A and 106B, e.g., via a wired connection (e.g., Ethernet and/or a similar connection), a wireless connection, and/or a combination of wired and wireless connections. For example, network 106A can be a layer-2 network, and network 106B can be a layer-2/layer-3 network. The MCLAG network device 102A can also be connected to networks (e.g., network 106A) using a MCAE interface 104. For example, the MCAE interface 104 can be a network device (and/or a virtualized interface instantiated by a number of physical ports, e.g., from the MCLAG network device 102A and/or from MCLAG network peers 102B) that can receive data packets from the MCLAG network device 102A, and that can forward the data packet to the network 106A, and/or to other networks 106 to which the MCAE interface 104 is coupled (not shown). The MCAE interface 104 can, for example, forward the data packet to a network 106A associated with a virtual local area network (VLAN) that is associated with the MCLAG network device 102A. In some implementations, for example, networks 106 can include a VLAN that includes the MCLAG network device 102A, and/or can be a part of the VLAN that includes the MCLAG network device 102A. The networks 106 can be connected to data centers 108, a global Internet 110, and/or other network entities, so as to interact with network devices outside of the networks 106A-B.

The MCLAG network device 102A can also be operatively coupled to MCLAG peers 102B (e.g., other MCLAG network devices, such as MCLAG network peers 102B that can be within the same VLAN as the MCLAG network device 102A). For example, the MCLAG network device 102A can be operatively coupled to MCLAG peers 102B via an interchassis link (ICL) 114. The ICL 114 can be a wired and/or wireless link between MCLAG peers 102B and the MCLAG network device 102A, and can allow the MCLAG network device 102A to communicate with the MCLAG peers 102B, e.g., using interchassis control protocol (ICCP) messages 112, to indicate that a loop has been detected. The ICL 114 can be used to instruct MCLAG network peers 102B to disable particular ports, and/or to take other actions, so as to prevent a loop from continuing to affect the MCLAG network device 102A. For example, the MCLAG network device 102A can send loop-detect data units (e.g., data units including information identifying a network loop, such as identifiers of ports involved in the network loop, and/or other information), via the ICL 114, to MCLAG network peers 102B, such that the MCLAG network peers 102B can use the information in the loop-detect data units to determine which ports to disable, and/or to determine that the MCAE interface is being disabled. In some implementations, the MCLAG network device 102A can be operatively coupled to a limited number of MCLAG network peers 102B (e.g., two MCLAG network peers 102B).

As one example, the MCLAG network device 102A can receive data packets from network 106B, and can send these data packets to other network devices, e.g., via sending the data packets, via the MCAE interface 104, to the network 106A. The network 106A can forward the data packets, via the MCAE interface 104, to other network devices. In the event of a loop on particular ports (e.g., MCAE ports, as described in further detail in FIG. 2), however, the MCLAG network device 102A may send a data packet to the network 106A, and the network 106A may send the data packet to the MCLAG network peer 102B. The MCLAG network peer 102B may send the data packet to the network 106B, e.g., based on information in the data packet, and the network 106B may forward the data packet back to the MCLAG network device 102A, causing a loop. Alternatively, one of MCLAG network device 102A or MCLAG network peer 102B may send a data packet, via the MCAE interface 104, that is received by the other device via the MCAE interface 104, indicating the presence of a network loop. In the event of a loop on a non-MCAE port (e.g., see FIG. 2 for more details regarding non-MCAE ports), conversely, the MCLAG network device 102A may send a data packet to the network 106A, and the network 106A may send the data packet to the network 106B (e.g., directly, and/or inadvertently by sending the data packet to a non-MCLAG network device, that forwards the data packet to the network 106B). The network 106B may then send the data packet to a MCLAG network peer 102B, but may also send the data packet back to the MCLAG network device 102A, causing or establishing a loop. Systems and methods herein describe an efficient way to address such loops.

Figure 2:
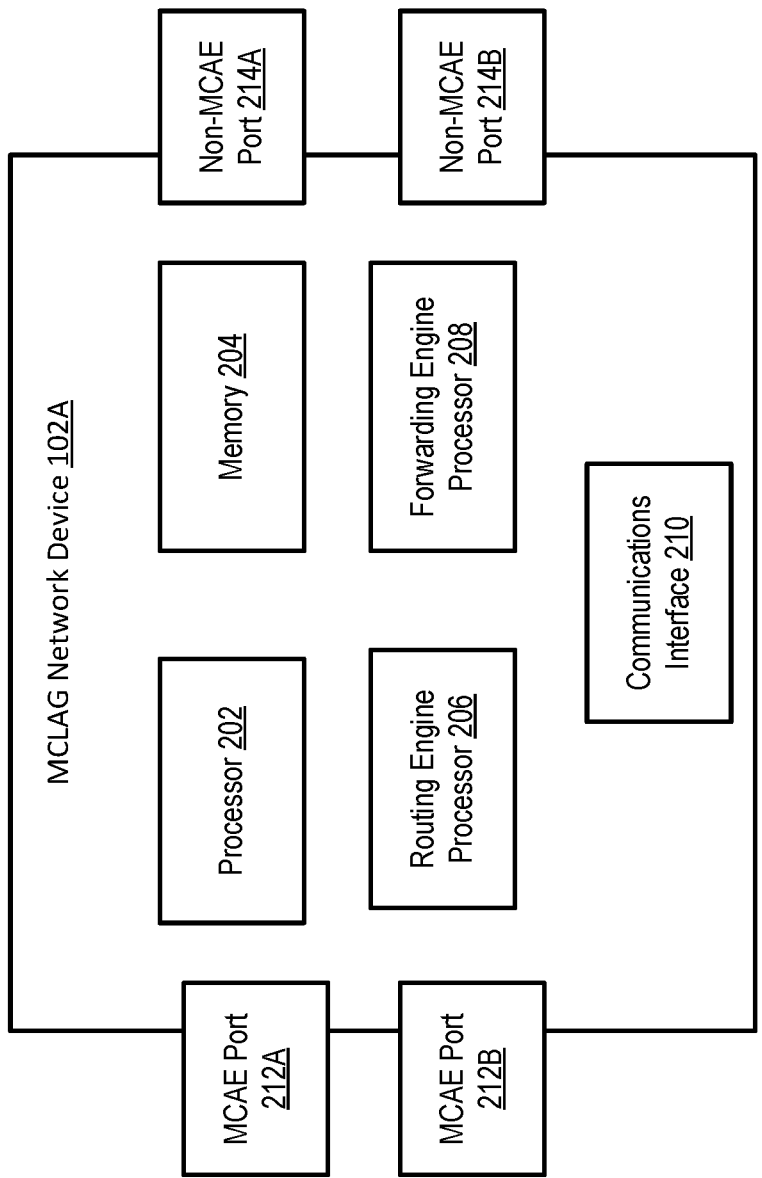
FIG. 2 is a schematic diagram illustrating a MCLAG network device, according to an embodiment.

FIG. 2 is a schematic diagram illustrating an example of a MCLAG network device 102A. For example, in some implementations, the MCLAG network device 102A can include processors (including at least one processor 202, a routing engine processor 206, and a forwarding engine processor 208), at least one memory 204, at least one communications interface 210, a set of MCAE ports 212A-B, and a set of non-MCAE ports 214A-B. The at least one processor 202 can be any hardware module and/or component configured to receive and process data, and/or to execute code representing executable instructions. In some implementations, for example, each of the at least one processor 202, the routing engine processor 206, and/or the forwarding engine processor 208 can be a general purpose processor, a Field Programmable Gate Array (FPGA), an Application Specific Integrated Circuit (ASIC), a Digital Signal Processor (DSP), and/or the like. In some implementations, each of the at least one processor 202, the routing engine processor 206, and/or the forwarding engine processor 208 can be implemented as separate processors, and/or as multiple processors. In other implementations, each of the at least one processor 202, the routing engine processor 206, and/or the forwarding engine processor 208 can be implemented in a single processor (e.g., such that the routing engine processor 206 and the forwarding engine processor 208 can be modules of the at least one processor 202). In such implementations, modules of the at least one processor 202 can be software components stored in the at least one memory 204 and executed by the at least one processor 202, and/or can be any assembly and/or set of operatively-coupled electrical components of the at least one processor 202.

The at least one memory 204 can be a hardware module and/or component configured to store data accessible by the at least one processor 202, the routing engine processor 206, and/or the forwarding engine processor 208, and/or to store code representing executable instructions for the processors. The at least one memory 204 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the at least one memory 204 stores instructions to cause the at least one processor 202, the routing engine processor 206, and/or the forwarding engine processor 208 to execute modules, processes and/or functions associated with the MCLAG network device 102A.

In some implementations, the at least one processor 202 can manage signals and/or data sent between components of the MCLAG network device 102A (e.g., can manage data sent from the routing engine processor 206 to the forwarding engine processor 208 or vice-versa, can forward signals received by the communications interface 210, the MCAE ports 212A-B, and/or the non-MCAE ports 214A-B to the routing engine processor 206 and/or the forwarding engine processor 208 for analysis, and/or the like). In some implementations, the forwarding engine processor 208 can be operatively coupled to the at least one processor 202, the at least one memory 204, the routing engine processor 206, the MCAE ports 212A-B, and/or the non-MCAE ports 214A-B. The forwarding engine processor 208 can be configured to receive data units sent in a network loop, and can cache data units detected within a network loop for forwarding at a later time (e.g., when the network loop has been resolved, and/or the like). The forwarding engine processor 208 can also discard data units, e.g., when a predetermined number of data units have been cached, when the data packets have been sent from a particular MCAE port 212, and/or the like. The forwarding engine processor 208 can also notify the routing engine processor 206 when a loop has been detected.

The routing engine processor 206 can be operatively coupled to the at least one processor 202, the at least one memory 204, the forwarding engine processor 208, the MCAE ports 212A-B, and/or the non-MCAE ports 214A-B. The routing engine processor 206 can send data packets to MCLAG network peers 102B and/or to other network devices (e.g., in response to network loops being detected, so as to inform the MCLAG network peers 102B that a network loop has been detected), and can select ports (e.g., MCAE ports 212A-B and/or non-MCAE ports 214A-B) from which to send the data units. The routing engine processor 206 can generate data units (e.g., tagged data units and/or untagged data units) to send, for example, to network 106A. The routing engine processor 206 can receive messages indicating that a loop has been detected, e.g., via the forwarding engine processor 208. The routing engine processor 206 can generate and send data units to the MCLAG network peers 102B, e.g., to inform the MCLAG network peers 102B that a network loop has been detected. The routing engine processor 206 can also send data packets, determined to have been sent within a network loop, to the forwarding engine processor 208, such that the data packets can be discarded.

The routing engine processor 206 can define transmit intervals (e.g., also referred to herein as loop-detect transmit intervals), so as to instruct the forwarding engine processor 208 to send loop-detect data units to network 106A during the transmit intervals. For example, transmit intervals can specify intervals and/or a frequency over a predetermined period of time during which the forwarding engine processor can send the loop-detect data units (e.g., every two hours, no more than 100 loop-detect data units in five minutes, and/or the like). In this manner, the routing engine processor 206 can limit the number of loop-detect data units sent to network 106A (e.g., to prevent data unit congestion). The routing engine processor 206 can also disable and/or enable ports of the MCLAG network device 102A, so as to disrupt network loops until the network loop can be resolved (e.g., until a network administrator manually resolves the network loop and enables the ports, until a predetermined timeout period expires, and/or the like).

In some implementations, the MCAE ports 212A-B can be ports designated by the at least one processor 202 and/or the routing engine processor 206 as multi-chassis aggregate interface (MCAE) ports. The MCAE ports 212A-B can collectively serve as an aggregate interface that can sort data packets received for multiple VLANs, and send data packets for each VLAN to ports of the MCLAG network device 102A and/or MCLAG network peers 102B that are associated with that VLAN. For example, the MCAE ports 212A-B can be part of a set of MCAE ports that includes ports from each of the MCLAG network device 102A and the MCLAG network peers 102B, that collectively serve as the aggregate interface for one or more VLANs. In some implementations, the aggregate interface can be the MCAE interface 104.

In some implementations, the non-MCAE ports 214A-B can be ports of the MCLAG network device 102A that do not implement the aggregate interface. The non-MCAE ports 214A-B can send data packets from and/or receive data packets at the MCLAG network device 102A. In some implementations, the communications interface 210 can be an interface that facilitates communication between the MCLAG network device 102A and other network devices coupled to the MCLAG network device 102A. For example, the communications interface 210 can be a wired (e.g., Ethernet and/or the like) interface, and/or a wireless interface, that can receive data from and/or send data to the Internet 110, to data centers 108, and/or other network devices, e.g., via network 106A and/or network 106B. The communications interface 210 can include at least a portion of non-MCAE ports 214A-B.

Figure 3:
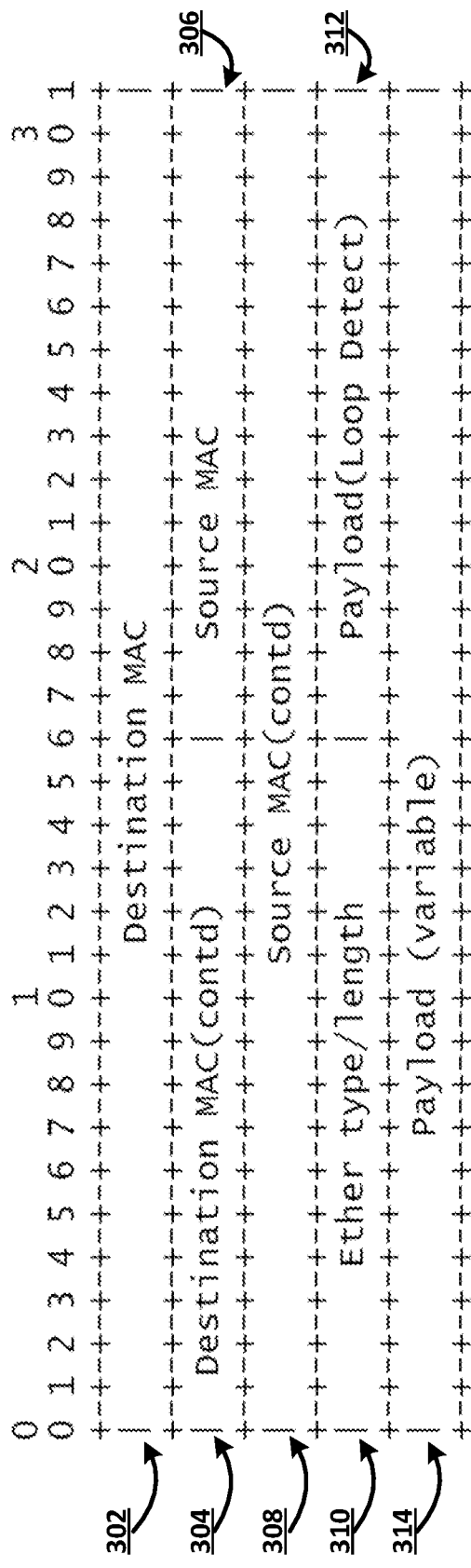
FIG. 3 is a diagram illustrating an untagged data unit, according to an embodiment.

FIG. 3 is a diagram illustrating an example of an untagged data unit 300. For example, in some implementations, an untagged data unit 300 may not be tagged with VLAN information, and therefore may be unassociated with any particular VLAN. Such untagged data packets 300 can include one or more fields for a destination device identifier 302-304 (e.g., a Media Access Control (MAC) address and/or a similar device identifier for a destination device), one or more fields for a source device identifier 306-308 (e.g., a MAC address and/or a similar device identifier for a source device), a type/length field 310 (e.g., a field indicating a protocol that is encapsulated in the data unit, such as an Ethernet protocol, and a size of the data unit, and/or the like), data unit payload fields 312-314 (e.g., including information being passed between network devices, including messages to network devices, loop detection information, and/or similar information), and/or other information. In some implementations, data units being forwarded by a MCLAG network peer 102B to network 106B, e.g., from network 106A, can include a source MAC address, and can also include a destination MAC address. MCLAG network peers 102B can determine whether or not a loop has been detected by receiving an untagged data unit 300 including information in the payload fields 312 that indicate that a loop has been detected (e.g., including a code indicating a network loop exists, an identifier of a suspected source of the network loop, identifiers of ports involved in the loop, and/or the like).

Figure 4:
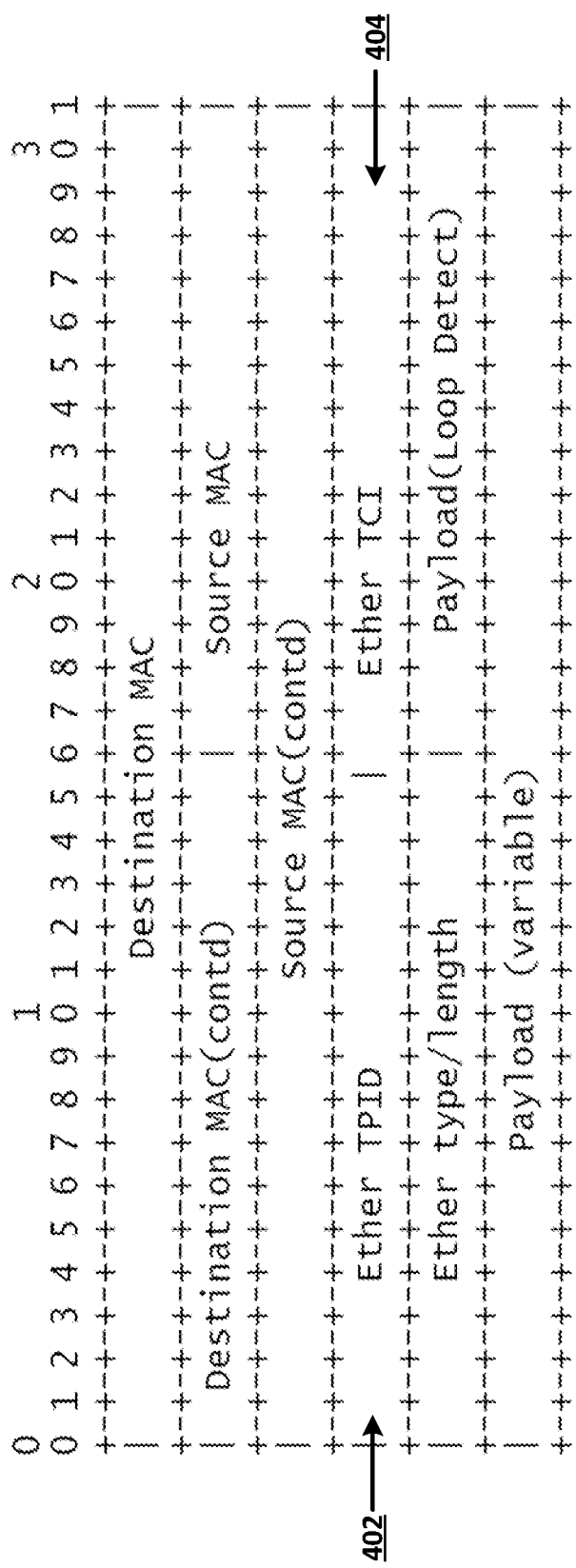
FIG. 4 is a diagram illustrating a tagged data unit, according to an embodiment.

FIG. 4 is a diagram illustrating an example of a tagged data unit 400. For example, in some implementations, a tagged data unit 400 can include information indicating that the tagged data unit 400 is intended to be sent within a VLAN, and/or to network devices within the VLAN. The tagged data unit 400 can include data included in an untagged data unit (e.g., source device identifiers 306-308, destination device identifiers 302-304, a type/length field 310, payload fields 312-314, and/or the like), and can also include information relating to the VLAN of the MCLAG network device 102A that generated and/or sent the tagged data unit. For example, the tagged data unit 400 can also include a tag protocol identifier (TPID) 402; e.g., can include a value that identifies the tagged data unit 400 as being tagged via a network standard for VLANs, including 802.1Q and/or similar VLAN standards), tag control information (TCI) 404; e.g., information identifying the VLAN of the MCLAG network device 102A, the type of traffic in which the tagged data unit 400 is included, and/or the like).

Figure 5:
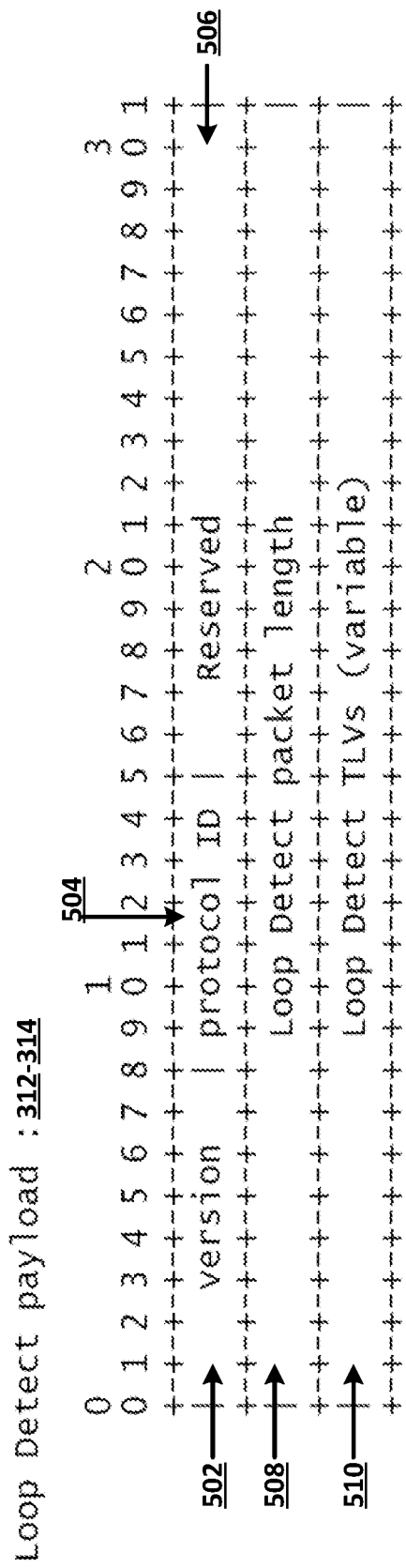
FIG. 5 is a diagram illustrating data unit payload information, according to an embodiment.

FIG. 5 is a diagram illustrating an example of data unit payload 312-314 information. For example, in some implementations, data unit payload fields 312-314 can include information about a loop, and can be included in either a tagged data unit 400 and/or an untagged data unit 300. The data unit payload can include protocol version information 502 for the data unit, a protocol identifier 504 of the protocol used to encapsulate the data unit, a length 508 of the data unit and/or of the portion of the data unit included in the payload fields, and/or loop detect type length value (TLV) information 510 for the data unit. In some implementations, the loop detect TLV information 510 can indicate a potential source port of the network loop (e.g., can include source port TLV information and/or other information about the potential source port). In some implementation, the data unit payload information can also include a reserved field 506.

Figure 6:
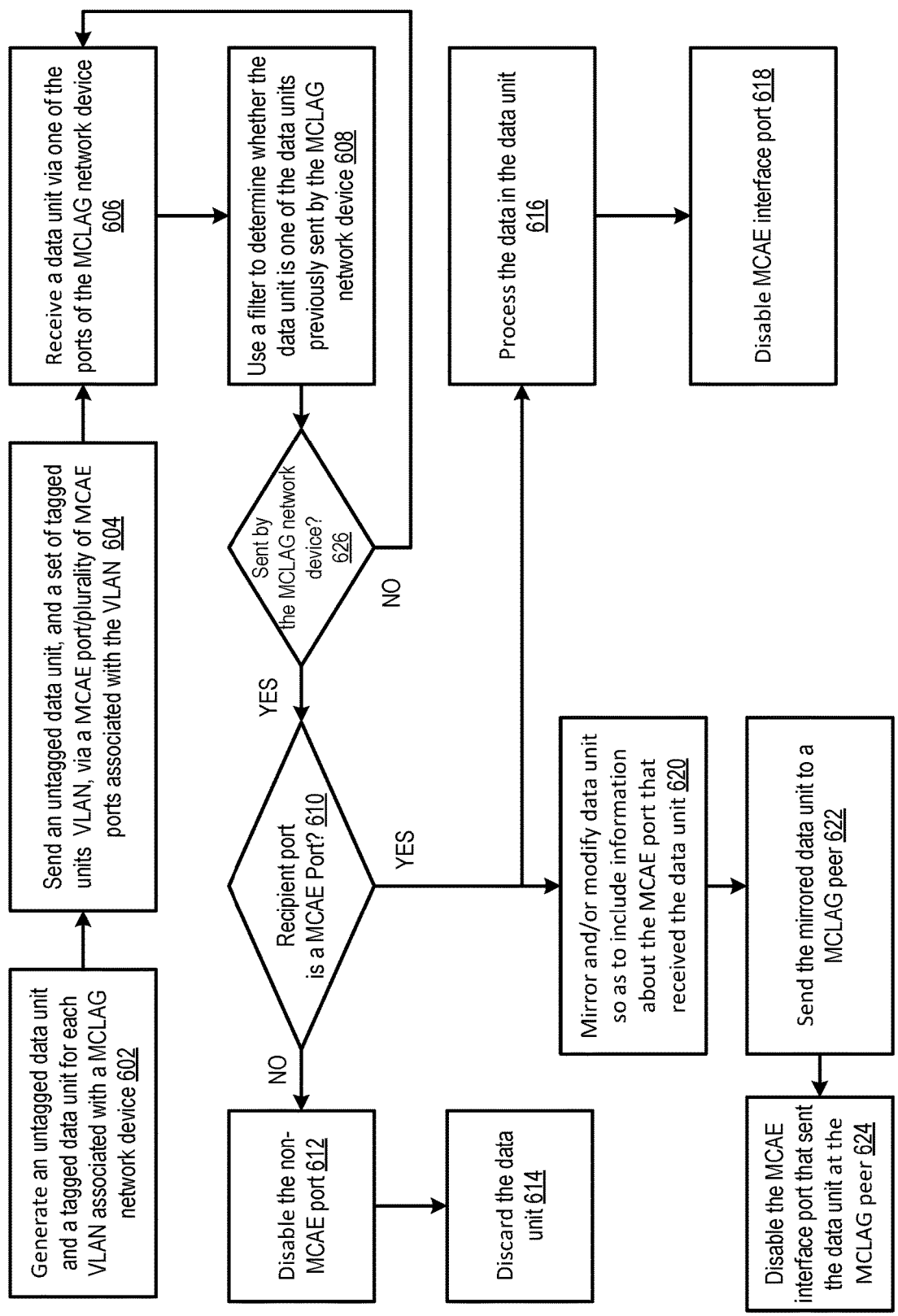
FIG. 6 is logic flow diagram illustrating disabling ports in response to a network loop, according to an embodiment.

FIG. 6 is logic flow diagram illustrating disabling ports in response to detecting a network loop based on receiving a previously-sent data unit, according to an embodiment. For example, in some implementations, a device (e.g., such as a MCLAG network device 102A) can generate an untagged data unit and/or a set of tagged data units. Specifically, a routing engine processor 206 of the MCLAG network device 102A can, at 602, generate the untagged data unit and/or the set of tagged data units. Each tagged data unit in the set of tagged data units can be associated with a particular VLAN from a set of VLANs that are associated with the MCLAG network device 102A. As one example, a first data unit can be associated with a first VLAN; a second data unit can be associated with a second VLAN and not the first VLAN; and a third data unit can be associated with a third VLAN. The third data unit can be a duplicate version of the first data unit, with a tag indicating that it is associated with the third VLAN, and not the first VLAN. Thus, multiple tagged data units including similar information, can be sent to multiple VLANS associated with the MCLAG network device 102A. The untagged data unit can be associated with a port from which the untagged data unit will be sent. The untagged data unit and/or the tagged data units in the set of tagged data units can include information intended to be sent to other network devices coupled to the MCLAG network device 102A (e.g., provisioning information, configuration information, and/or other information). The routing engine processor 206 can, for each VLAN with which the MCLAG network device 102A is associated, send, at 604, the untagged data unit and the set of tagged data units that are associated with that VLAN to the MCAE interface 104 for sending to network 106A. Specifically, the routing engine processor 206 can send the data units to one of the MCAE ports 212A-B of the MCLAG network device 102A, such that the MCAE ports 212A-B can forward the data units to other ports of the MCAE interface 104, for transmission to other network elements via network 106A.

The forwarding engine processor 208 can also receive, at 606, a data unit (e.g., a tagged data unit and/or an untagged data unit) via one of the ports of the MCLAG network device 102A (e.g., one of the MCAE ports 212A-B of the MCLAG network device 102A, and/or one of the non-MCAE ports 214A-B of the MCLAG network device 102A). The forwarding engine processor 208 can use, at 608, a data unit filter (e.g., a source MAC and/or destination MAC filter) to determine, at 626, whether or not the received data unit is one of the tagged and/or untagged data units that was previously sent by the MCLAG network device 102A (e.g., sent via MCAE port 212A). In some implementations, the forwarding engine processor 208 can also monitor data units to determine whether the data units were previously sent by the MCAE interface 104. For example, MCLAG network device 102A and MCLAG network peer 102B can, by nature of their association with the MCAE interface 104, be associated with a MCAE interface MAC address. The forwarding engine processor 208 can then check data units for the MCAE interface MAC address, and determine that the the data unit was previously sent by the MCAE interface 104, even if the data unit does not include specific information about MCLAG network device 102A or MCLAG network peer 102B.

If the forwarding engine processor 208 determines that the data unit was not previously sent by the MCLAG network device 102A and/or the MCAE interface 104, the forwarding engine processor 208 can continue to monitor for data units sent by the MCLAG network device 102A and the process can continue at 606 (e.g., can continue to receive data units, and to use the data unit filter to determine whether or not the data units were sent by the MCLAG network device 102A). If the forwarding engine processor 208 determines that the data unit was previously sent by the MCLAG network device 102A and/or the MCAE interface 104, the forwarding engine processor 208 can take steps to mitigate the network loop. For example, the forwarding engine processor 208 can, at 610, determine whether or not the recipient port is a MCAE port 212A-B (i.e., whether or not the port that received the data unit is associated with a particular VLAN). If the recipient port is not a MCAE port 212A-B, the forwarding engine processor 208 can notify the routing engine processor 206 that a network loop was detected for the non-MCAE port 212A-B. The routing engine processor 206 can, at 612, disable the non-MCAE recipient port, and can send the data unit to the forwarding engine processor 208. The forwarding engine processor 208 can, at 614, discard the received data unit.

If the forwarding engine processor 208 determines that the recipient port is a MCAE port 212A-B, the forwarding engine processor 208 can provide the data unit to the routing engine processor 206 for processing, at 616, (e.g., can determine what information is in the data unit and/or perform a configuration, provisioning, and/or other action based on the information). The routing engine processor 206 can also, at 618, disable the a port of the MCAE interface 104 that received the data unit. The forwarding engine processor 208 can also, at 620, mirror (e.g., generate a copy) and/or modify the received data unit, so as to include information about the MCAE port 212A that received the data unit. For example, the forwarding engine processor 208 can modify the payload information of the data unit, and/or can mirror the data unit with added payload information, so as to include a TLV of the MCAE port 212A and/or of the MCAE interface 104 port, and/or other information that can be used to identify the detected loop. The mirrored and/or modified data unit is also referred to herein as the loop-detect data unit.

The forwarding engine processor 208 can forward the mirrored and/or modified data unit to the routing engine processor 206, such that the routing engine processor 206 can send, at 622, the mirrored and/or modified data unit to a MCLAG network peer 102B (thereby notifying the MCLAG network peer 102B that a network loop has been detected). The mirrored and/or modified data unit can instruct the MCLAG network peer 102B (specifically, a routing engine processor 206 at the MCLAG network peer 102B) to disable, at 624, the MCAE interface 104 port at the MCLAG network peer 102B that sent the data unit to the MCLAG network device 102A. Specifically, the MCLAG network peer 102B can disable the MCAE interface 104 port that sent the data unit to the MCLAG network device 102A by disabling any ports at the MCLAG network peer 102B that are associated with a port identifier included in the payload field 312 of the mirrored and/or modified data unit. In some implementations, the MCLAG network peers 102B can also be instructed to disable other ports associated with the MCAE interface 104. The MCLAG network device 102A and MCLAG network peers 102B can continue to disable the ports until predetermined criteria have been met (e.g., until the routing engine processor 206 has not detected a data unit that was sent by the MCLAG network device 102A for a predetermined period of time, until the forwarding engine processor 208 receives a data unit indicating (e.g., via information stored in the payload field of the data field) that the network loop has been resolved, until the ports are manually enabled, e.g., by a network administrator, until a predetermined auto-recovery activation time period has elapsed, and/or the like).

Figure 7:
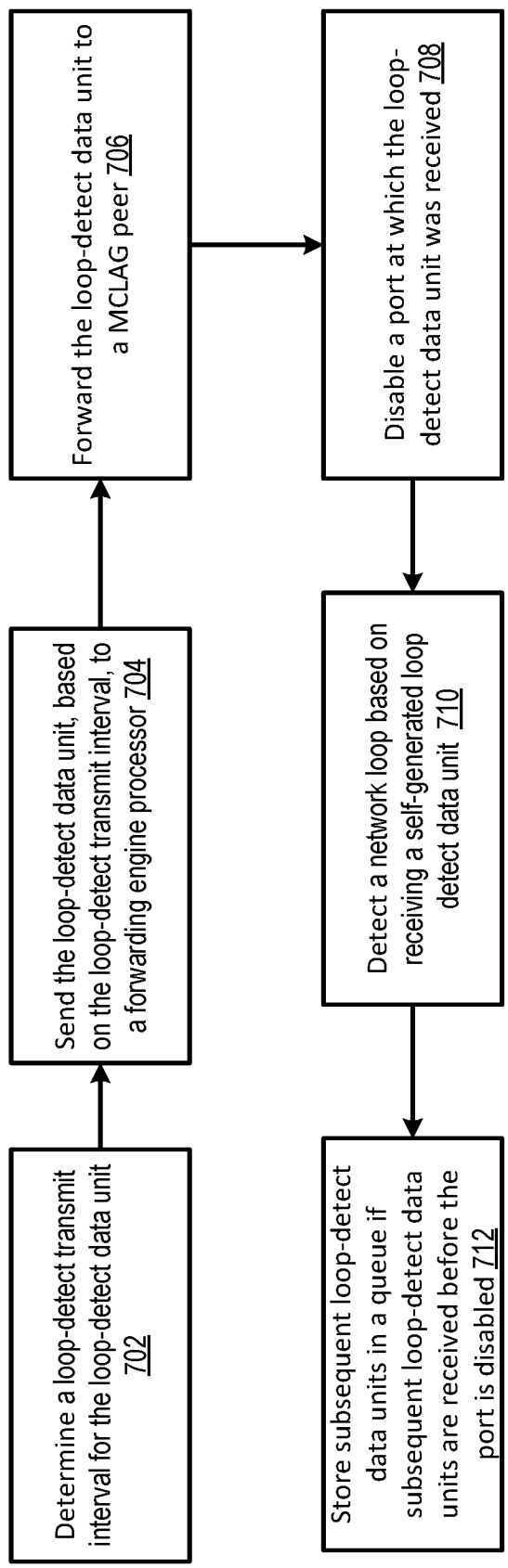
FIG. 7 is logic flow diagram illustrating processing data units when a network loop is detected, according to an embodiment.

FIG. 7 is logic flow diagram illustrating the processing of data units when a network loop is detected based on a loop detect data unit, according to an embodiment. For example, in some implementations, the routing engine processor 206 can also determine, at 702, a transmit interval for forwarding a loop-detect data unit to network 106A. In some implementations the routing engine processor 206 can also use a predetermined transmit interval for transmitting the loop-detect data units. In some implementations, the transmit interval can be modified and/or dynamically changed, e.g., in response to a volume of loop-detect data units being sent from forwarding engine processor 208, and/or the like. For example, in some implementations, the transmit interval can be increased (e.g., the routing engine processor 206 can change the transmit interval so as to reduce the number of times loop-detect data units are sent from the forwarding engine processor 208) when the volume of loop-detect data units being sent from forwarding engine processor 208 exceeds a first predetermined threshold (e.g., a predetermined maximum loop-detect data unit threshold). Conversely, in some implementations, the transmit interval can be decreased (e.g., the routing engine processor 206 can change the transmit interval so as to increase the number of times loop-detect data units are sent from the forwarding engine processor 208) when the volume of loop-detect data units being sent from forwarding engine processor 208 falls below the first predetermined threshold, and/or a second predetermined threshold (e.g., a predetermined minimum loop-detect data unit threshold).

The routing engine processor 206 can send, at 704, the loop-detect data unit, and/or any other loop-detect data units generated since a previous loop-detect data unit and/or a previous set of loop-detect data units were sent, to the forwarding engine processor 208, e.g., based on the loop-detect transmit interval. In some implementations, instead of the routing engine processor 206 sending the loop-detect data unit to the forwarding engine processor 208 on the transmit interval, the routing engine processor 206 can provide transmit interval information to the forwarding engine processor 208 when the routing engine processor 206 sends the loop-detect data unit to the forwarding engine processor 208. The forwarding engine processor 208 can then forward, at 706, the loop-detect data unit to network 106A. The forwarding engine processor 208 can also forward the loop-detect data unit to MCLAG network peer 102B (e.g., via an ICCP message 112 over the ICL 114) such that the MCLAG network peer 102B can disable at least one port of the MCLAG network peer 102B that is involved in the network loop. The forwarding engine processor 208 can further, at 708, disable a port at which the loop-detect data unit was received.

The MCLAG network device 102A (e.g., via the forwarding engine processor 208 of the MCLAG network device 102A) can detect, at 710, a network loop, e.g., based on a self-generated loop-detect data unit received at the MCLAG network device 102A (e.g., based on a loop detect data unit that includes source and/or destination port TLV information). The forwarding engine processor 208 can send a notification to the routing engine processor 206, to notify the routing engine processor 206 that a network loop was detected. The routing engine processor 206 can disable, at 708, the port at which the loop-detect data unit was received by the MCLAG network device 102A. The forwarding engine processor 208 can then determine an action to perform with subsequent loop-detect data units received at the MCLAG network device 102A. For example, the forwarding engine processor 208 can discard subsequent loop-detect data units that are received by the forwarding engine processor 208, e.g., until the forwarding engine processor 208 is notified that the disabled MCAE port(s) involved with the network loop are enabled. In some implementations, the forwarding engine processor 208 can store, at 712, loop-detect data units in a queue maintained by the forwarding engine processor 208 (e.g., and stored in the at least one memory 208), when the loop-detect data units are received between a time in which the forwarding engine processor 208 detects a network loop, and a time at which the MCAE port(s) are disabled.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Clojure©, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method, comprising:
    sending a first data unit and a second data unit at a predetermined transmit interval via a first multi-chassis aggregate interface (MCAE) port associated a virtual local area network (VLAN);
    forwarding the second data unit to a network peer when the second data unit is received at the first MCAE port;
    disabling the port of the MCAE interface when the second data unit is received at the first MCAE port;
    disabling the non-MCAE port when the second data unit is received at a non-MCAE port associated with the first VLAN; and
    discarding the second data unit when the second data unit is received at a second MCAE port associated with a second VLAN different from the first VLAN.

2. The method of claim 1, wherein forwarding the second data unity to the network peer includes forwarding the second data unit to the network peer via mirroring the second data unit on an interchassis link (ICL) operatively coupled to the network peer.

3. The method of claim 1, wherein forwarding the second data unity to the network peer includes forwarding the second data unit to the network peer via an interchassis control protocol (ICCP) message sent over a control plane of a network connecting the apparatus and the network peer.

4. The method of claim 1, further comprising:
    detecting that the second data unit has been received at the first MCAE port using a media access control (MAC) address filter that matches a combination of a source MAC address and a destination MAC address.

5. The method of claim 1, further comprising:
    determining a loop detect transmit interval,
    the forwarding the second data unit including forwarding the second data unit to a destination network element based on the loop-detect transmit interval.

6. A method, comprising:
    generating a untagged data unit and a set of tagged data units, a tagged data unit of the set of tagged data units being associated with a virtual local area network (VLAN) from a plurality of VLANs;
    sending the untagged data unit and the set of tagged data units via a plurality of ports, a port from the plurality of ports associated with the VLAN, the port being associated with a port of a multi-chassis aggregate (MCAE) interface;
    receiving a tagged data unit via the port, the received tagged data unit being included in the set of tagged data units;
    determining a loop-detect transmit interval;
    forwarding the received tagged data unit to a multi-chassis link aggregation group (MCLAG) peer device when the received tagged data unit is associated with the VLAN and based on the loop-detect transmit interval;
    disabling the MCAE interface in response to the port receiving the received tagged data unit when the received tagged data unit is associated with the VLAN.

7. The method of claim 6, wherein the forwarding the received tagged data includes forwarding the received tagged data unit to the MCLAG peer device after modifying the received tagged data unit so as to include information associated with the port of the MCAE interface.

8. The method of claim 6, wherein the forwarding the received tagged data includes forwarding the received tagged data unit to the MCLAG peer device via mirroring the tagged data unit on an interchassis link (ICL) operatively coupled to the network peer.

9. The method of claim 6, wherein the forwarding the received tagged data includes forwarding the received tagged data unit to the MCLAG peer device via an interchassis control protocol (ICCP) message sent over a control plane to the network peer.

10. The method of claim 6, wherein the sending includes sending a tagged data unit and an untagged data unit for each port from the plurality of ports, via that port.

11. The method of claim 6, wherein the forwarding the received tagged data includes forwarding the received tagged data unit to the network peer after modifying the received tagged data unit so as to include (1) information about the port of the MCAE interface, and (2) instructions to disable the port of the MCAE interface.

12. The method of claim 6, wherein the set of tagged data units includes a tagged data unit associated with each of a set of VLANs from the plurality of VLANS with which the port from the plurality of ports is associated.

13. The method of claim 6, wherein the port from the plurality of ports is a first port from the plurality of ports, the received tagged data unit is a first tagged data unit, the method further comprising:
    receiving a second tagged data unit included in the set of tagged data units and at a second port from the plurality of ports, the second port from the plurality of ports being a non-MCAE port; and
    disabling the second port in response to the port receiving the second tagged data unit.

14. The method of claim 6, further comprising:
    receiving an untagged data unit at the port from the plurality of ports, the disabling the MCAE interface including disabling the port of the MCAE interface in response to the port receiving the untagged data unit when the untagged data unit is associated with the VLAN, forwarding the received tagged data unit including forwarding the received untagged data unit to the network peer after modifying the untagged data unit so as to include (1) information about the port of the MCAE interface, and (2) instructions to disable the port of the MCAE interface.

15. An apparatus, comprising:

a first network device having a processor and a port operatively coupled to the processor, the port of the first network device being associated with a virtual local area network (VLAN) and being associated with a port of a multi-chassis aggregate (MCAE) interface, the processor configured to generate a first data unit and a second data unit that includes a tag, the port of the first network device configured to send the first data unit and the second data unit to a destination device, the port of the first network device configured to receive the second data unit, the processor configured to detect the second data unit has been received at the port of the first network device, using a media access control (MAC) address filter that matches a combination of a source MAC address and a destination MAC address;

the processor configured to forward, after receiving the second data unit, the second data unit to a second network device associated with the VLAN and operatively coupled to the first network device; and the processor configured to disable the port of the MCAE interface in response to receiving the second data unit at the port of the first network device.

16. The apparatus of claim 15, wherein the port of the first network device is a physical MCAE port.

17. The apparatus of claim 15, wherein the processor is configured to forward the second data unit by mirroring the second data unit on an interchassis link (ICL) operatively coupled to the second network device.

18. The apparatus of claim 15, wherein the processor is configured to forward the second data unit by sending an interchassis control protocol (ICCP) message to the second network device sent over a control plane of a network connected to the first network device and the second network device.

19. The apparatus of claim 15, wherein the processor is configured to forward the second data unit after the second data unit is modified so as to include (1) information about the port of the MCLAG interface, and (2) instructions to disable the port of the MCLAG interface.

20. The apparatus of claim 15, wherein:

the port of the first network device is configured to receive the first data unit; and the processor is configured to disable the port of the first network device in response to receiving the first data unit at the port of the first network device.

\* \* \* \* \*